(12) United States Patent
Maier

(10) Patent No.: US 11,313,947 B2
(45) Date of Patent: Apr. 26, 2022

(54) METHOD AND SYSTEM FOR SIMULATION-ASSISTED DETERMINATION OF ECHO POINTS, AND EMULATION METHOD AND EMULATION APPARATUS

(71) Applicant: AVL LIST GMBH, Graz (AT)

(72) Inventor: Franz Michael Maier, Graz (AT)

(73) Assignee: AVL List GmbH, Graz (AT)

( * ) Notice: Subject to any disclaimer, the term of this patent is extended or adjusted under 35 U.S.C. 154(b) by 350 days.

(21) Appl. No.: 16/474,751

(22) PCT Filed: Dec. 28, 2017

(86) PCT No.: PCT/EP2017/084681
§ 371 (c)(1),
(2) Date: Jun. 28, 2019

(87) PCT Pub. No.: WO2018/122282
PCT Pub. Date: Jul. 5, 2018

(65) Prior Publication Data
US 2020/0025875 A1 Jan. 23, 2020

(30) Foreign Application Priority Data

Dec. 29, 2016 (AT) .............................. A 51188/2016

(51) Int. Cl.
*G01S 7/40* (2006.01)
(52) U.S. Cl.
CPC .......... *G01S 7/4052* (2013.01); *G01S 7/4021* (2013.01); *G01S 7/4095* (2021.05)
(58) Field of Classification Search
CPC ..... G01S 7/4021; G01S 7/4052; G01S 7/4095
See application file for complete search history.

(56) References Cited

U.S. PATENT DOCUMENTS

| 3,002,188 A | 9/1961 | Abbott et al. |
| 3,903,521 A | 9/1975 | Jensen et al. |

(Continued)

FOREIGN PATENT DOCUMENTS

| CN | 103809163 | 5/2014 |
| CN | 104391283 | 3/2015 |

(Continued)

OTHER PUBLICATIONS

U.S. Appl. No. 16/474,799, filed Jun. 28, 2019, Gruber et al.
(Continued)

*Primary Examiner* — Timothy X Pham
(74) *Attorney, Agent, or Firm* — Sheridan Ross P.C.

(57) ABSTRACT

A method and a system for simulation-assisted determination of at least one actual echo point of an object, and a method and an emulation apparatus for emulating a detection target. Here, a predicted object reference point of the object and a predicted sensor device reference point of a sensor device, in particular a radar-based sensor device, are calculated on the basis of an actual object reference point and an actual sensor device reference point and a predicted echo point of the object is calculated on the basis of an emission characteristic of the sensor device, the predicted object reference point, and the predicted sensor device reference point. Moreover, a predicted relative relationship, in particular a spatial relative relationship, is calculated between the predicted echo point and the predicted object reference point. An updated actual object reference point is calculated, in particular at least substantially in real time, and a simulated actual echo point of the object determined on the basis of the predicted relative relationship and the updated actual object reference point, in particular at least substantially in real time. The simulated actual echo point output.

13 Claims, 4 Drawing Sheets

(56) References Cited

U.S. PATENT DOCUMENTS

Figure 1:
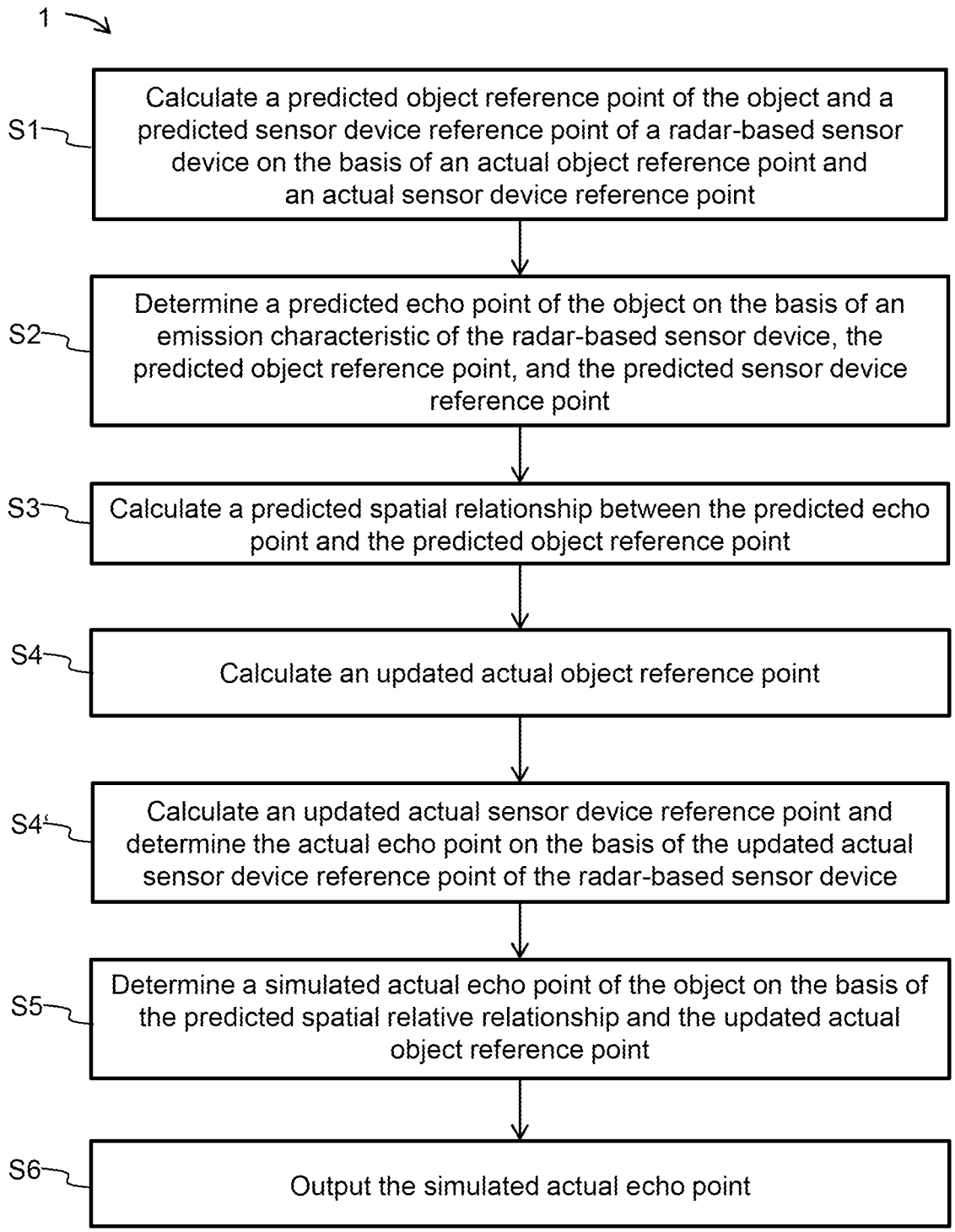

| | | |
|---|---|---|
| 4,316,159 A | 2/1982 | Ho |
| 4,660,041 A | 4/1987 | Maples et al. |
| 5,247,843 A | 9/1993 | Bryan |
| 5,339,087 A | 8/1994 | Minarik |
| 5,518,400 A | 5/1996 | Otiode et al. |
| 5,892,479 A | 4/1999 | Mills et al. |
| 6,191,735 B1 | 2/2001 | Schineller |
| 6,346,909 B1 | 2/2002 | Johnson et al. |
| 6,989,788 B2 | 1/2006 | Marion et al. |
| 8,248,297 B1 | 8/2012 | Baker et al. |
| 2003/0222693 A1 | 12/2003 | Cohen et al. |
| 2004/0012517 A1 | 1/2004 | Abou-Jaoude et al. |
| 2004/0201518 A1 | 10/2004 | Pace et al. |
| 2007/0285315 A1 | 12/2007 | Davis et al. |
| 2009/0309783 A1 | 12/2009 | Shih et al. |
| 2010/0109940 A1* | 5/2010 | Williams ............ G01S 7/4052 342/171 |
| 2015/0350223 A1* | 12/2015 | Spivack ............. H04W 4/029 726/4 |
| 2016/0245900 A1 | 8/2016 | Hurtarte et al. |
| 2017/0115378 A1 | 4/2017 | Haghighi et al. |
| 2017/0132334 A1* | 5/2017 | Levinson ............ G06F 30/20 |
| 2017/0307732 A1 | 10/2017 | Haghighi et al. |
| 2019/0391234 A1 | 12/2019 | Gruber et al. |

FOREIGN PATENT DOCUMENTS

| | | |
|---|---|---|
| CN | 105510980 | 4/2016 |
| CN | 106802593 | 6/2017 |
| DE | 2523288 | 12/1976 |
| DE | 3888993 | 10/1994 |
| DE | 69221121 | 3/1998 |
| DE | 102007002370 | 7/2008 |
| DE | 112012004728 | 7/2014 |
| DE | 102014017831 | 6/2016 |
| DE | 102014118622 | 6/2016 |
| DE | 102014118625 | 6/2016 |
| DE | 102015121297 | 3/2017 |
| EP | 0061559 | 10/1982 |
| EP | 1341000 | 9/2003 |
| GB | 2444161 | 5/2008 |
| JP | S60-223303 | 11/1985 |
| JP | H04-212083 | 8/1992 |
| JP | H07-280924 | 10/1995 |
| JP | H09-230029 | 9/1997 |
| JP | H09-270772 | 10/1997 |
| JP | 2001-524676 | 12/2001 |
| JP | 2003-149324 | 5/2003 |
| JP | 3928837 | 6/2007 |
| KR | 10-2016-0050121 | 5/2016 |
| WO | WO 99/08129 | 2/1999 |
| WO | WO 2011/008146 | 1/2011 |
| WO | WO 2016/025683 | 2/2016 |

OTHER PUBLICATIONS

U.S. Appl. No. 16/753,848, filed Apr. 6, 2020, Gruber et al.
U.S. Appl. No. 16/753,866, filed Apr. 6, 2020, Gadringer et al.
Mcmillian et al. "A 500 MHz GaAs digital RF memory modulator IC," Gallium Arsenide Integrated Circuit (GAAS IC) Symposium, 1996, Technic AL Digest 1996, 18th Annual Orlando, Fl. USA, Nov. 3-6, 1996, IEEE, pp. 73-76.
Vorderderfler et al. "Frequency dividers in radar target stimulator applications," Elektrotechnik & Informationstechnik, 2018, vol. 135, No. 4-5, pp. 344-351.
Official Action for Austria Patent Application No. A 51188/2016, dated Jul. 27, 2017, 3 pages.
International Search Report for International (PCT) Patent Application No. PCT/EP2017/084681, dated Apr. 19, 2018, 2 pages.
Mukti et al. "A preliminary result on development of analog broadband tapped delay line for L-band applications," International Seminar on Intelligent Technology and Its Applications (ISITIA), Lombok, Indonesia, Jul. 2016, pp. 357-362 (Abstract only).
English Translation of International Preliminary Report on Patentability for International (PCT) Patent Application No. PCT/EP2017/084681, dated Jul. 11, 2019, 8 pages.
Duan et al. "Finite-time Boundedness and I1-gain Analysis for Discrete Positive Switched Systems with Time-varying Delay," Proceedings of the 32nd Chinese Control Conference, Jul. 26-28, 2013, Xi'an, China, pp. 2090-2095.

* cited by examiner

METHOD AND SYSTEM FOR SIMULATION-ASSISTED DETERMINATION OF ECHO POINTS, AND EMULATION METHOD AND EMULATION APPARATUS

CROSS REFERENCE TO RELATED APPLICATIONS

This application is a national stage application under 35 U.S.C. 371 and claims the benefit of PCT Application No. PCT/EP2017/084681 having an international filing date of 28 Dec. 2017, which designated the United States, which PCT application claimed the benefit of Austria Patent Application No. A 51188/2016 filed 29 Dec. 2016, the disclosures of each of which are incorporated herein by reference in their entireties.

The present invention relates to a method and a system for simulation-assisted determination of an actual echo point of an object as well as a method and an emulation apparatus for emulating a detection target.

Among that involved in controlling driver assistance systems, in particular highly automatic or autonomous vehicles, data from a plurality of sensors is processed, on the basis of which their objects, such as other vehicles, pedestrians, buildings, etc., can be identified and correlated. In order to secure such systems and thereby ensure high road safety, road tests are usually conducted. The testing expenditure can thereby be reduced by making use of hardware-in-the-loop (HiL) testing procedures, wherein the respective systems are connected to an HiL simulator via their inputs and outputs. This thereby allows these systems to be easily tested in a simulated environment; i.e. a virtual world.

So that these tests render reality particularly reliably, the aim is to substantially simulate the environment in real time. A particular challenge is thereby integrating radar sensors in such an HiL testing procedure since the necessary simulating of the propagation; i.e. transmission and reflection, of electromagnetic waves in the virtual world is generally quite complex; i.e. processor-intensive.

It is a task of the invention to improve the determination of simulated echo points.

This task is solved by a method and a system for echo point determination as well as a method and an emulation apparatus for emulating a detection target in accordance with the independent claims. Advantageous embodiments of the invention are claimed in the dependent claims. The teaching of the claims is hereby made part of the description.

A first aspect of the invention relates to a method for the simulation-assisted determination of at least one actual echo point of an object, wherein the method comprises the following procedural steps: calculating a predicted object reference point of the object and a predicted sensor device reference point of a sensor device, in particular radar-based sensor device, on the basis of an actual object reference point and an actual sensor device reference point; determining a predicted echo point of the object on the basis of an emission characteristic of the sensor device, the predicted object reference point and the predicted sensor device reference point; calculating a predicted relative relationship, in particular a spatial relative relationship, between the predicted echo point and the predicted object reference point; calculating, in particular at least substantially in real time, an updated actual object reference point; determining, in particular at least substantially in real time, a simulated actual echo point of the object on the basis of the predicted relative relationship and the updated actual object reference point; and outputting the simulated actual echo point.

An echo point in the sense of the invention specifies in particular the point at which a signal, in particular electromagnetic waves, for instance a radar signal, is reflected by an object. Preferably, the object reflections of signals, in particular on multiple surfaces of the object, are combined into one echo point, thus attaining an idealization of reality. In particular, an echo point can always be assigned to an object reference point; i.e. a distance vector from the object reference point pointing toward the echo point can be calculated.

To be understood by prediction in the sense of the invention is in particular the predicting of the progress, in particular the interpolation, of a variable through for instance simulation and/or modeling, in particular of points or respectively coordinates of e.g. reference points of an object. Such a reference point can for instance be a center of mass.

In terms of the invention, a signal allocates information to a measurable physical variable such as, for example, an electrical voltage, a sound pressure or a field strength. This information can originate from the measurement of a physical process, for example reflection at an echo target. The information can also be impressed on a signal by a technical modulation process in order to transmit any information to a suitable receiver device by means of a signal. In general, signals change their magnitude as a function of time and a further information-bearing variable. Preferably, this inventively relates to an actual signal, e.g. electro-magnetic waves, able to be generated and received in particular by an antenna.

The invention is in particular based on the realization that an echo point of a simulated object can be calculated for a predicted future simulated situation by for instance a ray tracing technique such that the predicted echo point can be assigned to the later occurring situation substantially without time delay, in particular substantially in real time. If the simulation is accordingly run in real time, actual echo points of individual simulation time periods (frames) can thereby also be output in real time in addition to actual object reference points. In other words, the echo point of a simulated object can be calculated for a predicted situation, for instance a predicted object reference point, which develops from a current situation such as an actual object reference point. Preferably, this is therefore then assigned to the actual situation, for instance the current actual object reference point, as its predicted indicated echo point subsequent its calculation.

The assigning of the predicted echo point to the current actual object reference point is preferentially effected on the basis of a predicted relative relationship between the predicted echo point and the predicted object reference point. Preferably, the predicted relative relationship indicates the distance and/or orientation between the predicted echo point and the predicted object reference point, in particular by means of a distance vector.

If the predicted development of the object reference point corresponds to the actual development, the predicted echo point of the simulated object also corresponds to the actual echo point. In contrast, if the predicted development of the object reference point deviates from the actual development, a slight deviation of the predicted echo point from the actual echo point can occur depending on the situation. In particular, this deviation relates to the predicted relative relationship such that for instance the distance and/or the orientation of the predicted echo point to the current actual object reference point does not match the actual distance and/or actual orientation. However, this deviation is minor and therefore negligible with no adverse effects, particularly in the context of HiL testing.

In particular, this deviation, as noted above, only arises situationally, for example only when the direction of motion of the object reference point changes. If in contrast the object reference point approaches the sensor device reference point, for example in simulated vehicles driving in a row or oncoming traffic, the distance of the object reference point and sensor device reference point is of no importance to the relative relationship of echo point and object reference point. Thus, in this case even with inaccurate prediction of the object reference point, an actual echo point of the actual object reference point is correctly determined.

Preferably, the deviation between the predicted echo point of the simulated object and the actual echo point is estimated and/or corrected. To that end, the deviation between the orientation of the predicted echo point to the predicted object reference point and the orientation of the predicted echo point to the current actual object reference point can for example be determined, for instance by reconciling the respective relative relationships and calculating a corresponding correction factor for correcting the predicted echo point therefrom.

Preferably, the simulated actual echo point is not dependent on the predictive algorithm and is updated in real time. Preferentially, a Doppler frequency deviation can also be updated in real time.

Overall, by determining a predicted echo point, the invention enables the reliable determination of an actual echo point, in particular substantially in real time.

Preferably, the predicted object reference point of the object and the predicted sensor device reference point of a sensor device are calculated on the basis of an actual object reference point and an actual sensor device reference point with data from a traffic simulation, in particular CarMaker® and/or VIRES®. Preferably, the traffic simulation thereby supplies the actual data, a further simulation is used for the prediction.

Preferably, the predicted echo point of the object is determined on the basis of an emission characteristic of the sensor device, the predicted object reference point and the predicted sensor device reference point in a ray tracing procedure, in particular OptiX®.

Preferably, the method can be also used to determine actual echo points of virtual signals; i.e. emitted by a simulated sensor device. In particular, the method can also be used to test simulated sensor devices in that the propagation of the virtual, in particular simulated, signals including the predicted object reference points of likewise simulated objects and a predicted sensor device reference point of the sensor device, are calculated, in particular modeled, for instance by means of a ray tracing procedure, in particular in a simulated traffic environment.

In one preferential implementation, the inventive method comprises the further following procedural steps: calculating an updated actual sensor device reference point, in particular at least substantially in real time; whereby the actual echo point is further determined on the basis of the updated actual sensor device reference point of the sensor device. Thereby taken into account is that the, in particular radar-based, sensor device is not stationary but in fact can move in particular linearly or accelerate. This for instance plays a role when the object is an at least substantially motionless object, for example a pedestrian or a building, relative to which the sensor device changes direction of motion or speed. In particular, a Doppler deviation of a signal reflected at a simulated object, in particular its echo point, can thereby be considered particularly reliable.

In a further preferential implementation, the procedural steps of the inventive method are periodically repeated. Preferably, when calculating the predicted object reference point and the predicted sensor device reference point, the prediction horizon is so far out as is needed to determine the predicted echo point of the object. Preferably, the prediction horizon thereby amounts to less than one second, preferentially less than approximately 500 ms, particularly preferentially less than approximately 200 ms, in particular at least approximately 100 ms. This thereby ensures that the predicted echo point reliably corresponds to an actual echo point of the current actual object reference point.

Preferably, for simulation time periods lying within the prediction horizon, the determining of a simulated actual echo point is thereby determined on the basis of a previous predicted relative relationship between a previous predicted echo point and a previous predicted object reference point on the one hand and the updated actual object reference point of the current simulation time period on the other hand. In other words, the actual echo points are preferentially determined based on a non-current predicted relative relationship until such time as a current predicted relative relationship is calculated.

In a further preferential implementation, the procedural steps of the method are periodically repeated. Preferably, the determining of a simulated actual echo point is repeated after approximately 10 ms, preferentially after approximately 5 ms, preferentially after approximately 2 ms, in particular after approximately 1 ms. Preferably the actual echo point can thereby also be determined based on a non-current predicted relative relationship between a previously determined predicted echo point and a previously calculated predicted object reference point. This thus ensures that the simulated actual echo point is determined at least substantially in real time and in particular HiL testing methods can thus be reliably performed.

In a further preferential implementation, the determination of the predicted echo point further takes into account an arrangement of the object, in particular its orientation, relative to the sensor device and/or the object dimensions, in particular the shape of the object. This thereby ensures that the predicted echo point renders the reflection of a signal on the object, in particular back toward the sensor device, particularly reliably, in particular realistically.

A second aspect of the invention relates to a method for simulating a detection target comprising the following procedural steps: checking whether a signal emitted by an in particular radar-based sensor device is received;

determining and outputting at least one simulated actual echo point as per the first aspect of the invention, in particular when a signal is received; modulating the received signal on the basis of the at least one simulated actual echo point; and transmitting the modulated signal to the sensor device.

Transmission in the sense of the invention means in particular return transmission. The signal is preferably only modulated and returned.

In one preferential implementation, the emitted modulated signal acts, in particular directly, on a receiver, in particular a transducer, preferably in the sense of DIN 1319-1, of the sensor device. This thereby ensures that the emitted modulated signal experiences no interference, in particular distortion, so that the sensor device can reliably detect one or more simulated objects, in particular a simulated environment.

A third aspect of the invention relates to a system for simulation-assisted determination of at least one actual echo point of an object comprising means for calculating a predicted object reference point of the object and a predicted sensor device reference point of an in particular radar-based sensor device on the basis of an actual object reference point and an actual sensor device reference point as well as means for determining a predicted echo point of the object on the basis of an emission characteristic of the sensor device, the predicted object reference point and the predicted sensor device reference point. Additionally, the system comprises means for calculating a predicted, in particular spatial, relative relationship between the predicted echo point and the predicted object reference point and means for calculating, in particular at least substantially in real time, an updated actual object reference point. The system furthermore comprises means for determining, in particular at least substantially in real time, a simulated actual echo point of the object on the basis of the predicted relative relationship and the updated actual object reference point, as well as means for outputting the simulated actual echo point.

Preferably, the system comprises one or more processing units, in particular central processing units (CPU) and/or graphics processors (GPU) which is/are configured to execute one or more procedural steps of the method according to the first aspect of the invention. Preferentially, the processing units are thereby controlled by a control unit. In particular, the control unit is configured to adapt the prediction horizon during the calculation of a predicted object reference point and a predicted sensor device reference point to the time period necessary for determining the predicted echo point of the object.

In one preferential implementation, the means for calculating a predicted object reference point and a predicted sensor device reference point is designed as a processing unit configured to run a traffic simulation, in particular CarMaker® and/or VIRES® and output the results of the simulation, in particular object reference points and sensor device reference points, in a preset chronological object cycle; i.e. a preset chronological succession of simulation time periods, preferably faster than approximately 10 ms, preferentially faster than approximately 5 ms, in particular faster than approximately 1 ms.

In a further preferential implementation, the means for determining a predicted echo point is designed as a processing unit configured to run a ray tracing procedure, in particular OptiX®, and output the results of the simulation, in particular echo points, in a preset chronological echo cycle, preferably faster than approximately 1 second, preferentially faster than approximately 500 ms, preferentially faster than approximately 200 ms, in particular fast than approximately 100 ms.

Preferably, the system can output actual echo points of simulated road users to any given, in particular predetermined, simulated traffic conditions.

A fourth aspect of the invention relates to an emulation apparatus for emulating a detection target which comprises a receiver module configured to receive a signal, in particular radar signal, emitted by a sensor device as well as a processing module incorporating a system according to the third aspect of the invention. The emulation apparatus moreover comprises a modulation module configured to modulate a signal received by the receiver module on the basis of the at least one simulated actual echo point as well as a control module configured to generate a control signal for an antenna, in particular at least partly on the basis of the at least one simulated actual echo point and/or the modulated signal. The emulation apparatus additionally comprises a transmitter module configured to transmit the modulated signal to the sensor device.

A receiver module in the sense of the invention refers in particular to an antenna for receiving electromagnetic waves. Preferably, the receiver module converts a signal characterized by electromagnetic waves into an electrical, in particular analog, signal able to be modulated.

Preferably, the receiver module furnishes/modulates a received signal with the characteristics determined by a simulation and then returns it thus modified.

Preferably, the emulation apparatus is designed as at least a part of an HiL testing system, whereby the sensor device is a radar-based sensor direction of a vehicle. In particular, the emulation apparatus is designed as at least a part of a test bench for highly autonomously moving vehicles.

In one preferential implementation, the transmitter module is configured to act, in particular directly, on a receiver, in particular a transducer, preferably in the sense of DIN 1319-1, of the sensor device. This thereby ensures that the emitted modulated signal experiences no interference, in particular distortion, so that the sensor device can reliably detect one or more simulated objects, in particular a simulated environment.

The features and advantages cited in the foregoing with respect to the first aspect of the invention also correspondingly apply, wherever technically feasible, to the second, third and fourth aspect of the invention and vice versa.

These and further features and advantages are otherwise apparent from the claims and from the description as well as from the drawings, wherein the respective individual features can each be realized in an implementation of the invention separately or as a plurality in the form of subcombinations and can represent an advantageous as well as patentable implementation for which protection is also claimed, provided same is technically expedient.

Figure 2:
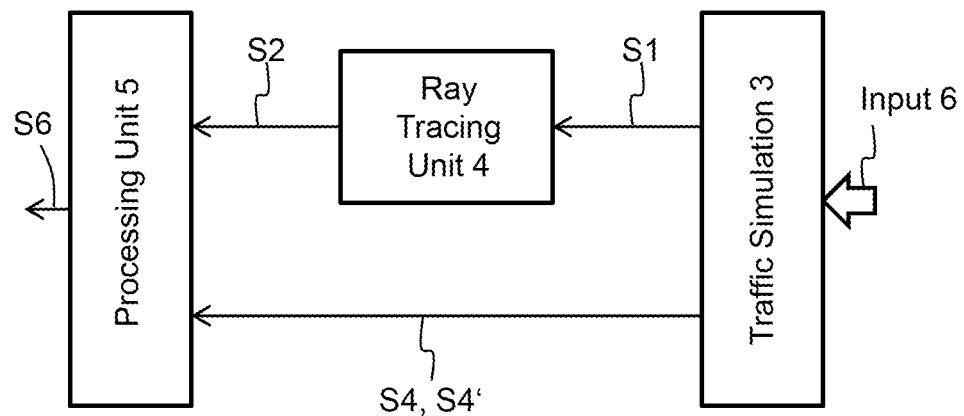
Figure 3:
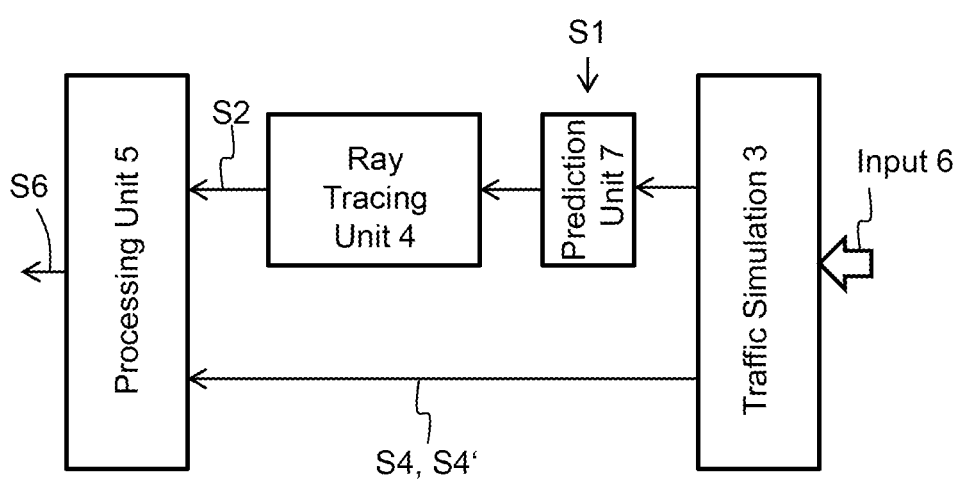
Figure 4:
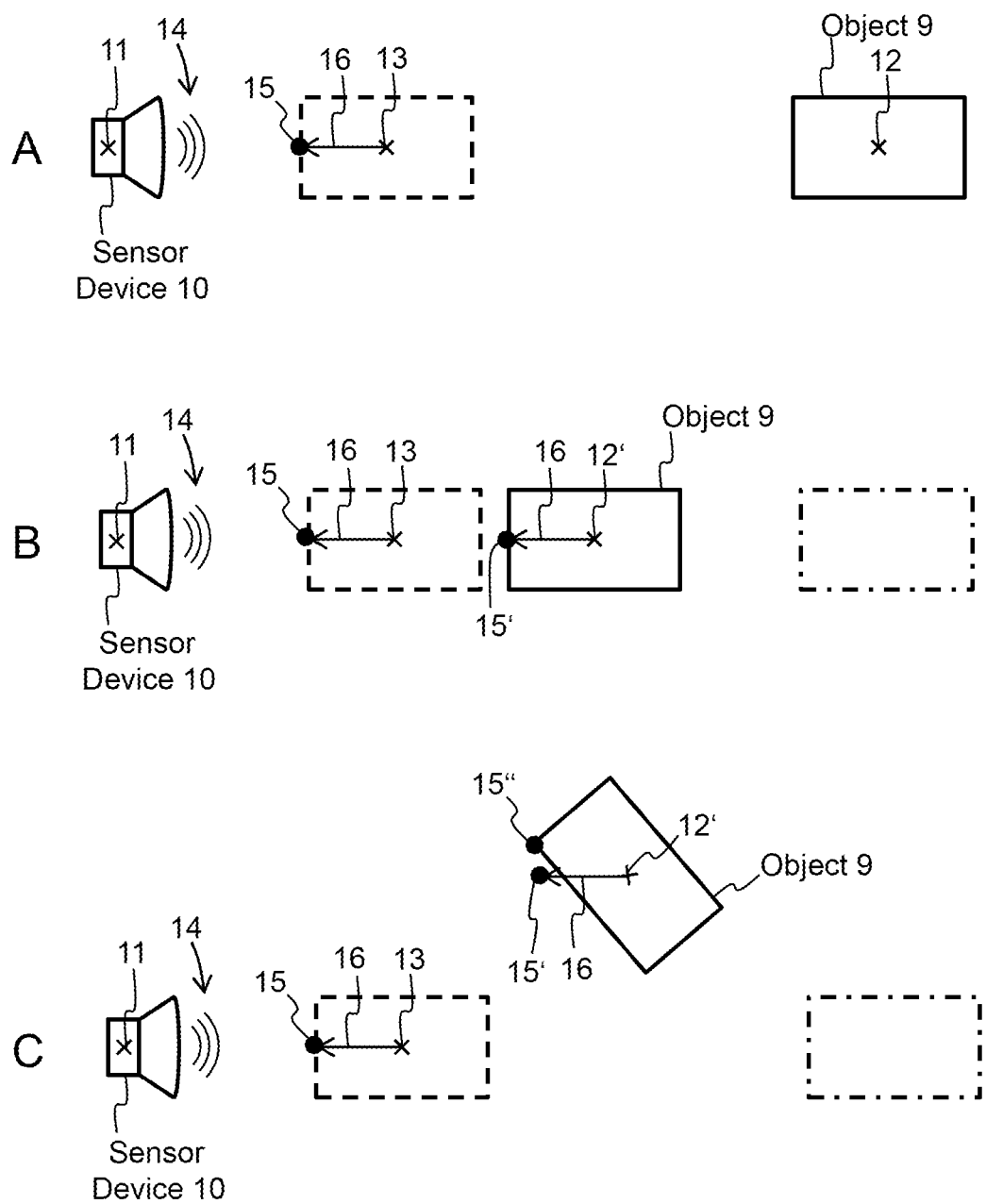
Figure 5:
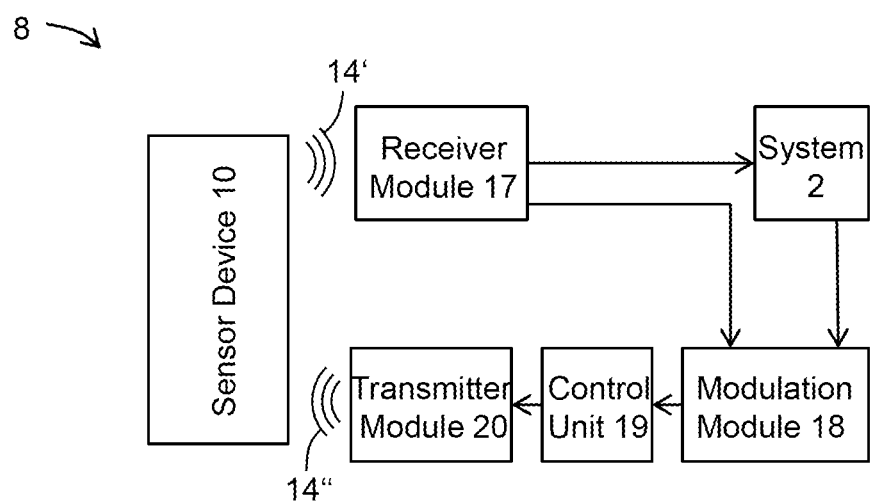

The invention will be described in greater detail below on the basis of non-limiting exemplary embodiments as depicted in the figures. Shown at least to some extent schematically therein:

FIG. 1 an exemplary embodiment of a method according to the invention;

FIG. 2 a first exemplary embodiment of an inventive system;

FIG. 3 a second exemplary embodiment of an inventive system;

FIG. 4A-C various scenarios in the determining of an actual echo point of a simulated object; and FIG. 5 one exemplary embodiment of an inventive emulation apparatus.

FIG. 1 shows an exemplary embodiment of a method 1 according to the invention.

In a first procedural step S1, the development of, in particular a predefined, traffic situation, is predicted based on coordinates of road users and a sensor device preferentially generated by a traffic simulation, for instance by simulating the various road users and sensor device, in particular their kinematics. A predicted object reference point is thereby calculated for each of the road users. Additionally, a predicted sensor device reference point is also calculated for a sensor device which is to detect signals, particularly reflected electromagnetic waves, from the road users.

In a second procedural step S2, the coordinates are determined from points at which signals emitted by the sensor device, in particular from each road user, would be reflected according to the simulated traffic conditions.

The signals, in particular radar signals, can thereby also be simulated, especially modeled, i.e. virtually replicated, for instance using a ray tracing procedure. In other words, signals emitted by the sensor device for detecting objects in reality are simulated and their propagation in the virtual environment of the simulated traffic situation calculated. This in particular yields the coordinates of each object's reflection points, so-called echo points.

Preferably, however, it is assumed that the sensor device does not move or respectively that the object moves in an inertial system of the sensor device. In this inertial system, the sensor device is at rest and only the relative motion of the object in relation to the sensor device is calculated.

The echo points are thereby contingent on the emission characteristic of the sensor device, the predicted object reference point and the predicted sensor device point; i.e. in particular on the coordinates of the road users and the sensor device. In particular, the echo points can also depend on the arrangements, for instance orientations, of the road users to the sensor device and/or the physical dimensions of the road users, in particular their profiles. Because these coordinates depend on object coordinates predicted in procedural step S1, they are called predicted echo points. Preferably, multiple expected echo points are thereby compiled into a single echo point.

Relative relationships, in particular spatial relative relationships, between the predicted echo points and the predicted object reference points can be calculated from the predicted echo points and the predicted object reference point in a third procedural step S3. A relative relationship is for instance a distance and/or an orientation, preferentially a distance vector, directed toward a predicted echo point from a predicted object reference point.

Updated road user coordinates; i.e. object reference points, can be calculated in a fourth procedural step S4 for the point in time at which calculation of the relative relationship is completed. This calculation is preferentially made at least substantially in real time.

The prediction horizon; i.e. the time period over which the traffic conditions given in the first procedural step S1 further develop, is thereby preferentially selected so as to substantially correspond to the time period needed to determine the predicted echo points.

In an additional fourth procedural step S4', updated sensor device coordinates continuing to move within the prediction horizon analogously to the road users are calculated.

Simulated actual echo points are determined in a fifth procedural step S5 by associating the updated coordinates of the road users and the updated coordinates of the sensor device with the relative relationships. In other words, predicted object reference points are replaced by current actual object reference points so that the starting points of the distance vectors shift.

The simulated actual echo points are then output in a sixth procedural step S6.

FIG. 2 shows a first exemplary embodiment of an inventive systems 2 for the simulation-assisted determination of at least one actual echo point which comprises a traffic simulation 3, a ray tracing unit 4 and a processing unit 5.

The traffic simulation 3 comprises an input 6 via which the traffic simulation 3 can be controlled. A traffic situation to be simulated can in particular be fed in via input 6 as can a prediction horizon indicating the time period over which the traffic situation is to progress. The traffic situation is in particular characterized by actual object reference points and actual sensor device reference points.

The traffic simulation 3 outputs a predicted object reference point and a predicted sensor device reference point to the ray tracing unit 4 in procedural step S1. The predicted reference points correspond for instance to road user and sensor device coordinates in the predicted future.

The predicted road user and sensor device reference point is processed in the ray tracing unit 4 to determine a predicted road user echo point and output it to the processing unit 5. This process is implied by procedural step S2.

The paths of the signals, e.g. electromagnetic waves, emitted by the sensor device, in particular their transmission or respectively refraction and/or reflection on simulated road user surfaces, are thereby simulated, for instance calculated.

The processing unit 5 is to that end configured to calculate a predicted relative relationship, in particular spatial relative relationship, between the predicted echo point and the predicted object reference point from the predicted echo point and the predicted object reference point calculated in procedural step S1. The position, in particular the distance and/or the orientation, of the predicted echo point relative to the predicted object reference point is thereby known.

When the determination of the predicted echo point and/or the predicted relative relationship is substantially completed, the traffic simulation 3 calculates an updated actual object reference point. In addition, the traffic simulation 3 can thereby also calculate an updated actual sensor device reference point. The updated reference points are output to the processing unit 5. This is implied by procedural steps S4, S4'.

The processing unit 5 is also configured to determine a simulated actual echo point of the simulated road user on the basis of the predicted relative relationship, the updated actual object reference point and the updated actual sensor device reference point, which can be output in procedural step S6.

FIG. 3 shows a second exemplary embodiment of an inventive system 2 comprising a traffic simulation 3, a ray tracing unit 4, a processing unit 5 and a prediction unit 7.

The traffic simulation 3 outputs the calculated actual object reference point and the actual sensor device reference point to the prediction unit 7 which is configured to calculate a predicted object reference point and a predicted sensor device reference point on the basis of the actual object reference point and the actual sensor device reference point. To that end, the prediction unit 7 models the development of the actual reference points, for instance the coordinates of road users and sensors. The prediction unit 7 can in particular be configured as a processing unit which performs a Kalman filtering and/or determines the coordi-nates by means of recursive least squares prediction or model-based RLSQ.

The prediction unit 7 then subsequently outputs the predicted object reference point and the predicted sensor device reference point to the ray tracing unit 4.

The present exemplary embodiment otherwise corresponds to the exemplary embodiment depicted in FIG. 2, in particular as regards its potential advantages.

FIGS. 4A-C show various scenarios in the determining of an actual echo point 8 of a simulated object 9.

In an initial position shown in FIG. 4A, a sensor device 10 is located at an actual sensor reference point 11 and a simulated object 9 at an actual object reference point 12. A prediction unit (see FIG. 3) predicts an object reference point 13 past a predetermined prediction horizon; i.e. after a predetermined period of time has elapsed.

A predicted echo point 15 of object 9 is determined on the basis of an emission characteristic 14 for a signal, for instance electromagnetic waves, emitted by the sensor device 10, the predicted object reference point 13 and a predicted sensor device reference point (which in the present example corresponds to the actual sensor device reference point for reasons of clarity) which reflects at least in an idealized way how and/or at which coordinates the object 9 reflects a signal emitted by the sensor device 10.

The predicted echo point 15 is thereby located on a side of the object 9 facing the sensor device 10.

A predicted relative relationship 16 between the predicted echo point 15 and the predicted object reference point 13 can be calculated on the basis of the pre-dicted echo point 15 and the predicted object reference point 13. In the present example, the predicted relative relationship 16 is depicted as a vector pointing from the predicted object reference point 13 to the predicted echo point 15.

When an updated object reference point of the simulated object 9 past the prediction horizon; i.e. after the predicted echo point and/or the predicted relative relationship is determined, corresponds to the predicted object reference point 13, the predicted echo point 15 is the actual echo point of the object.

FIG. 4B depicts a first situation after the prediction horizon; i.e. after the predicted echo point and/or the pre-dicted relative relationship having been determined.

The simulated object 9 has thereby moved toward the sensor device 10, in parti-cular its reference point 11, whereby its updated actual object reference point 12' does not coincide with the predicted object reference point 13. The original position of the simulated object 9 is thereby indicated by dashed/dotted line.

Since the actual echo point 15' is determined on the basis of the predicted relative relationship 16 and the updated actual object reference point 12', the actual echo point 15' reflects the actual position of the echo point of the simulated object 9, although there is a discrepancy between the updated object reference point 12' and predicted object reference point 13.

FIG. 4C depicts a second situation after the prediction horizon; i.e. after the predicted echo point and/or the pre-dicted relative relationship having been determined.

The simulated object 9 has thereby changed its direction of motion; i.e. taken a curved path. Since the position of an actual echo point 15" depends on the shape and/or orientation of the object 9 to the sensor device 10, the actual echo point 15" in this example shifts into the corner of the object 9 facing the sensor device. The predicted relative relationship 16 used to determine the actual echo point 15' therefore does not point to the actual echo point 15" of the object 9.

Preferably, the actual echo point 15' can be corrected on the basis of the deviation of the object 9 orientation at the predicted object reference point 13 and the updated actual object reference point 12', for instance by a correction factor being calculated for the deviation and incorporated into the determination of the actual echo point 15'.

FIG. 5 shows an exemplary embodiment of an inventive emulation apparatus 8 for emulating a detection target which comprises a receiver module 17, a system 2 for simulation-assisted determination of at least one actual echo point, a modulation module 18, a control module 19 and a transmitter module 20.

The receiver module 17, e.g. an antenna, receives the actual signal 14' emitted by a sensor device 10, in particular electromagnetic waves, for instance a radar signal.

By means of the simulating of a traffic situation in which for instance a driver assistance system of a vehicle comprising the sensor device (10) is to be tested and the virtual ray tracing of the signals 14' received by the receiver module 17, actual echo points are determined by the system 2 and output to the modulation module 18.

The modulation module 18 modulates the signal 14' received by the receiver module 17 in accordance with the actual echo points, in particular so that a modulated signal 14" is characterized by the traffic conditions simulated by the system 2, and outputs it to the control module 19. The latter controls a transmitter module 20, for instance an antenna, in particular by means of a control signal, such that the transmitter module 20 can transmit the modulated signal 14" which is ultimately received by the sensor device 10.

LIST OF REFERENCE NUMERALS 1 method
2 system
3 traffic simulation
4 ray tracing unit
5 processing unit
6 input
7 prediction unit
8 emulation apparatus
9 object
10 sensor device
11 sensor device reference point
12 actual object reference point
12' updated actual object reference point
13 predicted object reference point
15 emission characteristic
14' signal
14" modulated signal
15 predicted echo point
15' actual echo point
15" true echo point
16 predicted relative relationship
17 receiver module
18 modulation module
19 control module
20 transmitter module
S1-S6 first to sixth method step
S4' additional fourth method step

What is claimed is:

1. A method for the simulation-assisted determination of at least one actual echo point of an object, comprising the following procedural steps:

S1 calculating, via one or more processing units, a predicted object reference point of the object and a predicted sensor device reference point of a radar-based sensor device on the basis of an actual object reference point and an actual sensor device reference point;

S2 determining, via the one or more processing units, a predicted echo point of the object on the basis of an emission characteristic of the radar-based sensor device, the predicted object reference point and the predicted sensor device reference point;

S3 calculating, via the one or more processing units, a predicted spatial relative relationship between the predicted echo point and the predicted object reference point;

S4 calculating, via the one or more processing units, an updated actual object reference point;

S5 determining, via the one or more processing units, a simulated actual echo point of the object on the basis of the predicted spatial relative relationship and the updated actual object reference point; and S6 outputting, via the one or more processing units, the simulated actual echo point.

2. The method according to claim 1, further comprising the following procedural step:

S4' calculating, via the one or more processing units, an updated actual sensor device reference point; wherein the actual echo point is further determined on the basis of the updated actual sensor device reference point of the radar-based sensor device.

3. The method according to claim 1, wherein the procedural steps of the method are periodically repeated and a prediction horizon in procedural step S1 is so far out as is needed to determine the predicted echo point of the object in procedural step S2, in less than one second.

4. The method according to claim 1, wherein the steps of the method are periodically repeated and procedural step S5 is repeated after approximately 10 ms.

5. The method according to claim 1, wherein the determination of the predicted echo point in procedural step S2 further takes into account an arrangement of the object relative to the radar-based sensor device and/or the object dimensions.

6. A method for emulating a detection target comprising the following procedural steps:

checking whether a signal emitted by a radar-based sensor device is received;

determining and outputting at least one simulated actual echo point according to the method of claim 1 when the signal is received;

modulating the received signal on the basis of the at least one simulated actual echo point; and emitting the modulated received signal to the radar-based sensor device.

7. The method according to claim 6, wherein the emitted modulated received signal acts on a receiver of the radar-based sensor device.

8. The method according to claim 1, wherein the one or more processing units includes at least one of a central processing unit (CPU) or a graphics processor (GPU).

9. A system for the simulation-assisted determination of at least one actual echo point of an object, comprising one or more processing units configured to execute the following procedural steps:

calculating a predicted object reference point of the object and a predicted sensor device reference point of a radar-based sensor device on the basis of an actual object reference point and an actual sensor device reference point;

determining a predicted echo point of the object on the basis of an emission characteristic of the radar-based sensor device, the predicted object reference point, and the predicted sensor device reference point;

calculating a predicted spatial relative relationship between the predicted echo point and the predicted object reference point;

calculating an updated actual object reference point;

determining a simulated actual echo point of the object on the basis of the predicted spatial relative relationship and the updated actual object reference point; and outputting the simulated actual echo point.

10. An emulation apparatus for emulating a detection target, comprising:

a receiver module configured to receive a signal emitted by a radar-based sensor device;

a processing module incorporating a system according to claim 9;

a modulation module configured to modulate the signal received by the receiver module on the basis of at least one simulated actual echo point;

a control module configured to generate a control signal for an antenna at least partly on the basis of the at least one simulated actual echo point and/or the modulated signal; and a transmitter module configured to transmit the modulated signal to the radar-based sensor device.

11. The emulation apparatus according to claim 10, wherein the transmitter module is configured to act on a receiver of the radar-based sensor device.

12. The system according to claim 9, wherein the one or more processing units includes at least one of a central processing unit (CPU) or a graphics processor (GPU).

13. A non-transitory computer-readable storage medium having stored thereon on instructions, that when executed by one or more processors cause to be performed a method for the simulation-assisted determination of at least one actual echo point of an object, wherein the method comprises:

calculating a predicted object reference point of the object and a predicted sensor device reference point of a radar-based sensor device on the basis of an actual object reference point and an actual sensor device reference point;

determining a predicted echo point of the object on the basis of an emission characteristic of the radar-based sensor device, the predicted object reference point, and the predicted sensor device reference point;

calculating a predicted spatial, relative relationship between the predicted echo point and the predicted object reference point;

calculating, an updated actual object reference point;

determining a simulated actual echo point of the object on the basis of the predicted, spatial, relative relationship and the updated actual object reference point; and outputting the simulated actual echo point.

* * * * *